Inventor.
Henry B. Babson
By Cheever, Cox & Moore
Attys.

Dec. 8, 1931.  H. B. BABSON  1,835,923
COW STANCHION
Filed July 14, 1930   2 Sheets-Sheet 2
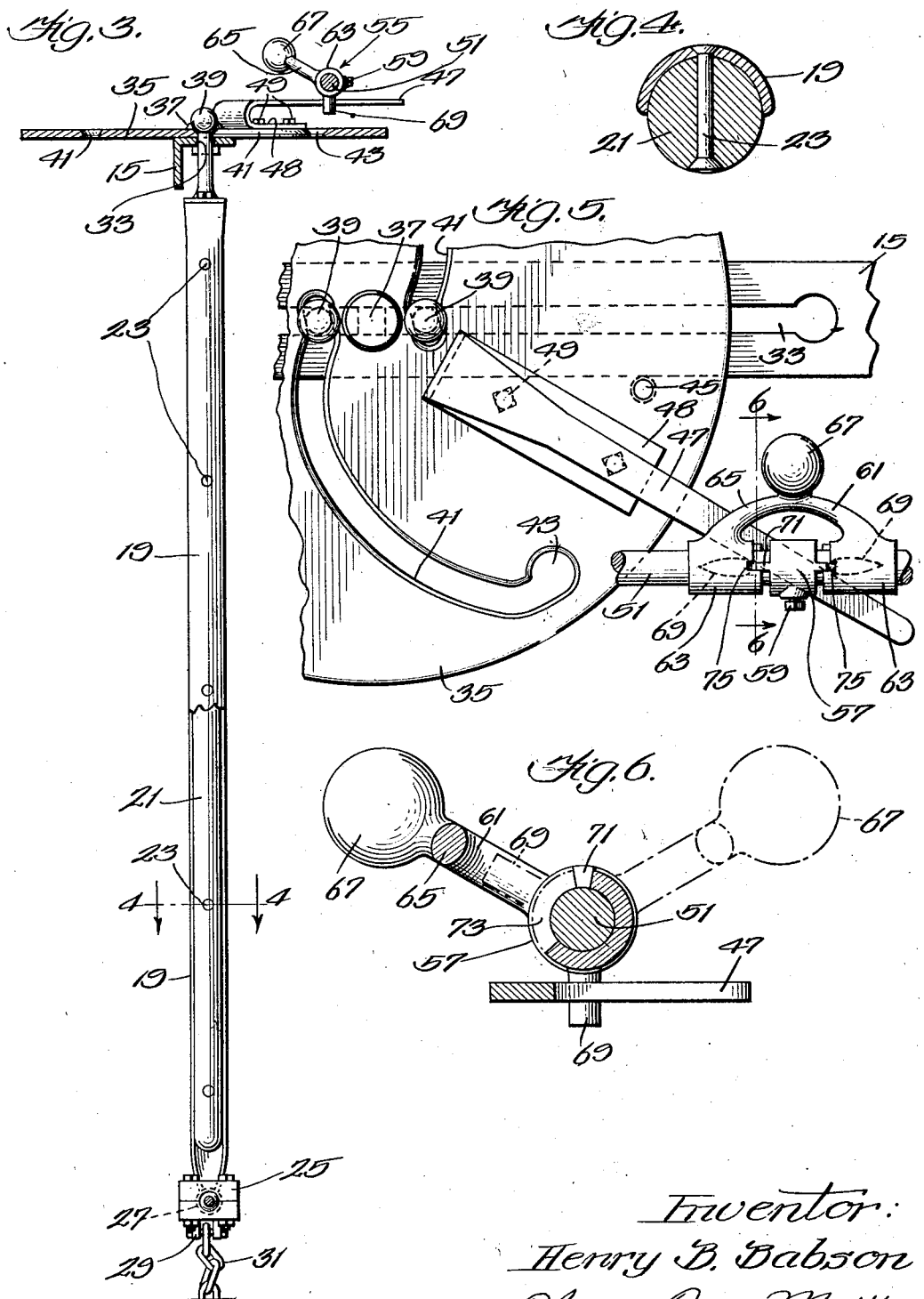

Patented Dec. 8, 1931

1,835,923

UNITED STATES PATENT OFFICE

HENRY B. BABSON, OF CHICAGO, ILLINOIS, ASSIGNOR TO BABSON MANUFACTURING CORPORATION, OF CHICAGO, ILLINOIS, A CORPORATION OF ILLINOIS

COW STANCHION

Application filed July 14, 1930. Serial No. 467,673.

My invention relates in general to animal stalls and has more particular reference to a stanchion for securing cows or other animals in stalls.

One important object of my invention is to provide a cow stanchion of novel design, cheap, inexpensive construction and capable of securely locking a cow or other animal in its stall.

Another important object of my invention is to provide means for locking and unlocking a plurality of stanchions simultaneously so that all stanchions of a set may be operated at one time from a master control.

Another object is to provide, in a mechanism for the gang, or simultaneous, operation of a set of stanchions, means for isolating one or more of the stanchions for individual operation.

Numerous other objects of the invention will be understood from the following description and taken in connection with the accompanying drawings, discloses a preferred embodiment of my present invention.

Referring to the drawings:

Figure 3 is a vertical section taken substantially along the line 3—3 in Figure 1;

Figure 4 is a horizontal section taken substantially along the line 4—4 in Figure 3;

Figure 5 is an enlarged view of a portion of the device as illustrated in Figure 2; and Figure 6 is a vertical section taken substantially along the line 6—6 in Figure 5.

Figure 1:
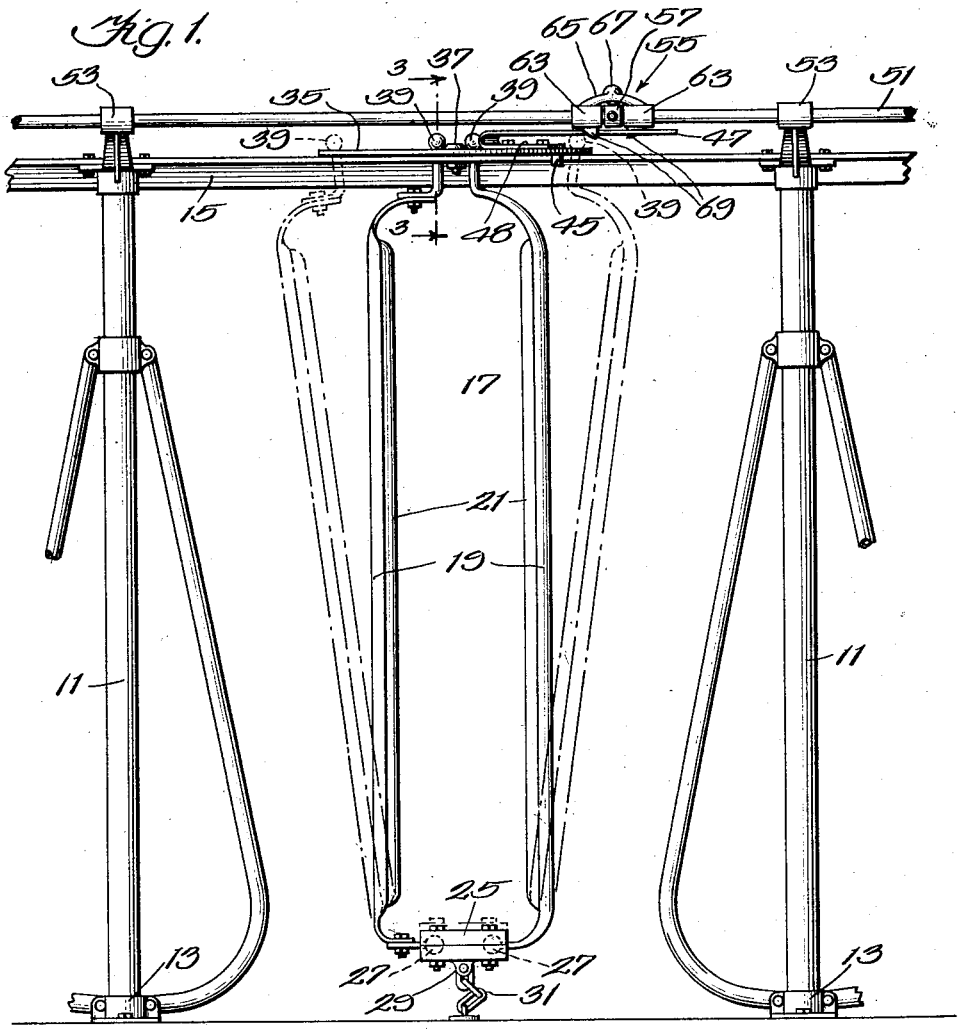
Figure 1 is a perspective view of a part of a row of stanchions arranged for gang operation in accordance with the teachings of my present invention.
Figure 2:
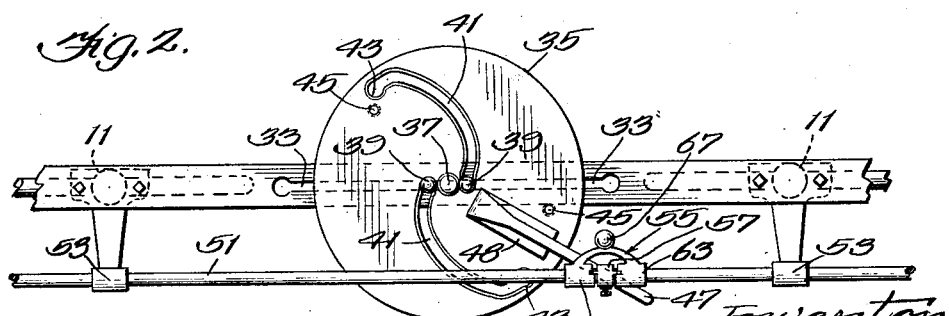
Figure 2 is a top plan view of the apparatus illustrated in Figure 1.

To illustrate my invention, I have shown on the drawings a section of a series or set of cow stanchions as arranged for gang operation. The stanchions are arranged in a spaced series, preferably along the side of the barn, using the animals to be stanchioned. The stanchions comprise yokes supported in spaced relationship in a frame comprising uprights 11 mounted to the floor of the barn in spaced relationship by means of brackets 13 of any suitable or preferred construction. The upper ends of the uprights 11 are connected by means of a member 15, which extends the entire length of the said stanchions, and a yoke 17 for receiving and securing the neck of the animal to be stanchioned is hung from the member 15 substantially mid-way between each adjacent pair of uprights 11 of the series forming the gang of stanchions. The yokes 17, each comprise a pair of arms 19, preferably formed of spring steel. The intermediate portions of the arms are preferably curved as illustrated in Figure 4 of the drawings to form channels facing inwardly and circular rods 21, preferably of wood, are received in these channels and secured thereto by means of fastening members 23, in order to provide a wearing surface for engaging the neck of the animal when the same is received in the stanchion. The lower ends of the arms 19 are or may be received in a holder 25 of any suitable conformation, but I prefer to form the holder with sockets in which the ends of the arms 19 are received, said ends being formed as balls 27 providing a universal movement in the sockets of the holder 25. The lower side of the holder 25 is also provided with lugs 29 providing means of connection with a chain 31, which said chain is connected with a staple set in the floor of the barn. The lower end of the stanchions are thus secured.

The upper ends of the arms 19 are supported by the cross member 15, the same being provided with an elongated slot 33 through which the upper ends of the arms 19 extend. The member 15 also carries a blade 35, which is rotatably mounted to the support 15 as by means of a pivot member 37, the plate 35 being arranged for rotation about an axis, substantially centered with respect to the stanchion. The upper ends of the arms 19 of each stanchion are formed as rods terminating in spherical knobs 39, the rods extending upwardly through the slot 33 of the support member 15 and upwardly through curved cam slots 41 formed in the plate 35, there being a curved cam slot 41 for each arm 19. These slots 41 extend in the plate 35, each from a circular perforation 43 formed in the plate adjacent the peripheral edge thereof. The perforations 43 are sufficient in size to permit the knobs 39 of the stanchion arms 19 to be introduced through the plate. The cam slots 41 extend in the plate 35 from the perforations 43 in a direction, which with ever increasing speed approaches the center of the plate as the same is turned so that the upper end of each arm, which is prevented from turning about the axis of rotation of the disc because it extends up through the slot 33 of the member 15, will when the disc is rotated be drawn from a position remote from the center of rotation of the disc (i. e. a position in the perforation 43) to a point closely adjacent the center of the disc where the cam slot 41 terminates. Each plate 35 contains a pair of oppositely disposed cam slots 41, each having an end of the pair of arms 19 forming a stanchion. Obviously as the disc is rotated in one direction, the arms 19 will be drawn together to the position illustrated in full lines of Figure 1 of the drawings, while if the disc is rotated in the other direction, the arms 19 will assume their position illustrated in dotted lines in Figure 1. In order to limit the movement of the disc 35 and thus to prevent a sheering effect from being exerted upon the upper ends of the arms 19 when the disc is turned until the said upper ends are in either end of the slots 41, I provide stop members 45 comprising pegs set in the disc in position to engage the edge of the member 15 and thus prevent further rotation of the disc 35 when the upper ends of the members 19 engage in either end of the slots 41.

It will be apparent from the foregoing that the stanchion 17 may be open or closed simply by rotating the disc 35 and in order to facilitate this operation, I provide an operating handle 47. This handle preferably comprises a curved strip of sheet metal, the shorter end 48 of which is preferably fastened to the disc 35 as by means of bolts or similar fastening members 49, the longer end of the member extending outwardly over the fastening means 49, and substantially outwardly of the peripheral edge of the disc 35 to form a lever adapted for manual operation of the disc, if desired.

It will be understood that a plurality or series of stanchions will be arranged in spaced relationship depending from the support member 15 to form a gang of stanchions and I have provided means for simultaneous operation, either opening or closing of all of the stanchions in the gang. In order to accomplish this I support from the frame, a shaft 51 by journaling the same in suitable extension members 53, carried by the uprights 11 and the support member 15. The shaft of course is arranged for axial or longitudinal movement with respect to the support members 53 and the shaft 51 is provided with any suitable means for manually accomplishing this longitudinal movement. The shaft also carried mounted thereon, opposite each operating handle 47 of each stanchion, a device for quickly and easily connecting or disconnecting the handle 47 with the shaft 51 to the end that longitudinal movement of the shaft 51 may be utilized to act upon the operating handle 47 of each stanchion to close or open the same. This coupling device I have indicated generally by the numeral 55 and it consists of a collar 57 encircling the shaft 51 and provided with a set screw 59 for securing the collar at any desired position on the shaft 51. The coupling device also comprises a yoke 61 comprising a pair of bearing sections 63, adapted to encircle the shaft 51 on either side of the collar 57, the bearing portions 63 being connected together and maintained in spaced relationship by means of an integrally formed connecting link 65, which extends substantially outwardly of the sides of the bearing portion 63 and is provided with an enlarged ball-like portion 67. Each bearing portion 63 also carries a downwardly extending ear 69, which form spaced lugs between which the handle 47 of the yoke operating mechanism may extend. The collar 57 is provided with outstanding tongues 71 on its opposite ends, which said tongues engage in segmental openings 73 formed in the inner ends of the bearing portion 63 so that the tongues 71 co-operate with the end edges of the opening 73 to limit the turning movement of the yoke 61 about the shaft 51.

If the yoke 61 is arranged in the position illustrated in full lines in Figure 6 of the drawings, the lugs 69 will extend downwardly on opposite sides of the handle 47 and the yoke will be maintained in position by the weight of the ball-like enlargement 67, which creates a turning movement about the axis of rotation of the yoke 61 to maintain one and each of the cut out portions 73 in engagement with the projection 71 of the collar 57. If the shaft 51 is now shifted axially, one or other of the lugs 69 will press against the handle 47 and thus cause rotation of the disc 35, which said rotation as hereinbefore described will result in the operation, either opening or closing, depending upon the way the shaft 51 is moved, of the yoke 17. In order to insure that the yoke 61 is rotated out of operative position illustrated in full lines in Figure 6 by the natural inertia of the operating mechanism controlled by the handle 47, I slightly relieve the bottom of the cut out portion 73 as at 75, opposite the position occupied by the projection 71 when the yoke 61 is in operative position with its projections 69, straddling the handle 47. The projections 71 also are slightly longer than the depth of the cut out portion 73, so that as soon as one or other of the lugs 69 engage the operating handle 47, the projections 71 will enter the notches 75 and will thus lock the yoke 61 against rotation on the shaft 51. This will prevent the yoke 61 from being thrown into the operative position illustrated in dotted lines in Figure 6 of the drawings during operation of the stanchion.

If, however, it is desired to disconnect any particular stanchion from gang operation, it is only necessary to disconnect the projections 71 from the notches 75 and rotate the yoke 61 in a counter clock-wise direction in Figures 3 and 6 of the drawings or to the position illustrated in dotted lines in Figure 6 in which said position, the lugs 69 are rotated out of straddling engagement with the handle 47 and thus when the shaft 51 is moved, there will be no connection for operating the handle 47, which may be operated manually and separately from the remaining stanchions of the set.

It is thought that the invention and numerous of its attendant advantages will be understood from the foregoing description and it is obvious that numerous changes may be made in the form, construction and arrangement of the several parts without departing from the spirit and scope of my invention or sacrificing any of its attendant advantages, the form hereinbefore described being a preferred embodiment for the purpose of illustrating my invention.

Having thus described my invention what I claim as new and desire to secure by Letters Patent is:

1. In a stanchion, a frame, a series of yokes for animals, said yokes being mounted in the frame, shiftable cam means for opening and closing each yoke, means to operate said cam means in a gang and means for disconnecting a said yoke from said operating means.

2. In a stanchion, a frame, a yoke mounted in the frame and comprising a pair of arms connected in said frame for opening and closing movement therein and rotatable cam means mounted in the frame and co-operating with the yoke for opening and closing said arms.

3. In a stanchion, a frame, a series of yokes for animals, said yokes being mounted in the frame and comprising each a pair of arms adapted for opening and closing movement in the frame, yoke operating means comprising a rotatable cam member for opening and closing each of said yokes, and means co-operating with each of said yoke operating means for actuating same in a gang.

4. In a stanchion, a frame, a series of yokes for animals, said yokes being mounted in the frame and comprising each a pair of arms adapted for opening and closing movement in the frame, co-operating cam means for opening and closing each of said yokes, master operating mechanism, each of said cam means for actuating the several cam means in a gang, each of said yoke operating means being capable of disconnection from said gang operating means.

5. In a stanchion, a frame, a yoke mounted in the frame and comprising arms arranged for opening and closing movement in the frame and means comprising a rotatable member pivoted in said frame and having cam portions co-operating with the yoke arms for opening and closing the same.

6. In a stanchion, a frame, a yoke comprising a pair of arms adapted for opening and closing movement carried in said frame and operating mechanism for said yoke, said mechanism comprising a member shiftably mounted in said frame and having an operative cam connection with said arms, whereby movement of said member will cause the arms of the yoke to open and close and means for shifting said member.

7. In a stanchion, a frame, a yoke comprising a pair of arms arranged for relative opening and closing movement carried in said frame, a pivoted member having a cam surface co-operating with a said arm to open and close same upon movement of said shiftable member and means comprising an axially shiftable shaft for moving said shiftable member.

8. In a stanchion, a frame, a yoke mounted in the frame, said yoke comprising relatively movable arms adapted for opening and closing movement, a shiftable member carried in said frame and having portions co-operating with said arms for effecting opening and closing movement thereof through the shifting of said member and operating means for shifting said member, said operating means comprising a shiftable member extending adjacent said operating means and a latch carried by said shiftable member and rotatable thereon about an axis parallel with the direction of movement of the shiftable member and adapted to form an operating connection between said shiftable member and said yoke operating means.

9. A stanchion having a yoke member movable into closed position for retaining the animal and to open position for releasing it, a support for the yoke member and movable cam means on the support co-operatively associated with the yoke member for operating said yoke member.

10. A stanchion having a yoke member movable into closed position for retaining the animal, and open position for releasing it, and a movable cam for operating said yoke member, said cam having a portion oblique to the path of movement of the cam for actuating the yoke member, and another portion differing in inclination from the first to an extent sufficient to lock the yoke member against reverse movement.

11. A stanchion having a yoke member movable into closed position for retaining the animal, and open position for releasing it, and a rotatable cam for operating said yoke member, said cam having a portion eccentric to the axis of the cam for moving the yoke member, and another portion of non-positive inclination for preventing a substantial amount of reverse movement of the yoke member.

12. A stanchion having a yoke member movable into closed position for retaining the animal, and open position for releasing it, and a cam having a slot confining within it a portion of the yoke member for positively moving the latter either to closed or open position in response to the movement of the cam.

13. A stanchion having a yoke member movable into closed position for retaining the animal, and open position for releasing it, a rotatable cam having a cam slot engaging a portion of the yoke member for positively controlling the latter, said slot having a portion eccentric to the axis of the cam for moving the yoke member, and another portion having an inclination sufficiently different from the first to prevent pressure on the yoke member from rotating the cam in the reverse direction.

14. A stanchion having a yoke member movable into closed position for retaining the animal and means comprising a member pivoted on the stanchion for rotation in a horizontal plane above said yoke, said member having a cam portion co-operating with the yoke for shifting the same.

15. A stanchion having a yoke member movable into closed position for retaining the animal and means comprising a plate pivoted for rotation on the stanchion and having a slot, a yoke actuated member extending in the slot, said slot extending in the plate from a point near the axis of rotation of the plate to a point relatively remote from said axis whereby, upon rotation of the plate, the yoke actuated member will be shifted to actuate the yoke.

16. A stanchion having a yoke member movable into closed position for retaining the animal, said stanchion having a guide member, a shiftable yoke actuating member co-operatively associated with said guide member whereby the same is confined for movement along a restricted path, an operating member pivoted on the stanchion for rotation adjacent the guide member and having a cam portion co-operating with the yoke actuating member for shifting the same along said restricted path in response to the rotation of the operating member.

17. A stanchion having a yoke member movable into closed position for retaining the animal, said stanchion having a guide member, a shiftable yoke actuating member co-operatively associated with said guide member, whereby the same is confined for movement along a restricted path, an operating member shiftably mounted on the stanchion adjacent said guide member and co-operatively associated with the yoke actuating member to move the same along its restricted path in response to the movement of the operating member in the stanchion.

18. A stanchion having a yoke member movable to closed position for retaining the animal, said stanchion having guide means comprising spaced portions defining an intermediate slot, said yoke member having a yoke actuating portion extending in said slot whereby the same is restricted for movement along a predetermined path and an operating member pivoted on said stanchion above said guide means and having a cam portion adapted to co-operate with the yoke actuating portion above said slot whereby rotation of the operating member will impart movement in the cam actuating member along the predetermined path defined by the guide means.

19. A stanchion having a yoke member movable to closed position for retaining the animal, said stanchion having guide means comprising spaced portions defining an intermediate slot, said yoke member having a yoke actuating portion extending in said slot whereby the same is restricted for movement along a predetermined path and an operating member comprising a disc pivoted on the stanchion and having a cam slot receiving the yoke actuating member above the guide means whereby, upon rotation of the disc, the yoke actuating member will be moved along the predetermined path.

20. A stanchion having a yoke member comprising a pair of spaced arms, the uppermost portion of which are adapted to be spread apart for opening the yoke, said stanchion having guide means comprising spaced portions defining a slot in which the open ends of said arms extend for restricted movement along said slot and a yoke operating member comprising a plate pivoted on said stanchion and having oppositely extending cam slots therein for receiving the upper ends of the yoke arms whereby, upon rotation of the plate, the arms may be spread apart or drawn together, as the case may be, by shifting the ends thereof along the guide slot.

21. A stanchion having a yoke member comprising a pair of spaced arms, the uppermost portion of which are adapted to be spread apart for opening the yoke, said stanchion having guide means comprising spaced portions defining a slot in which the open ends of said arms extend for restricted movement along said slot and a yoke operating member movably mounted on the stanchion, cam portions co-operatively engaging the yoke arms whereby to move same in said slot in response to the movement of the actuating member.

22. A stanchion having yoke members comprising arms arranged for opening and closing movement and means comprising a rotatable member pivoted in said stanchion for rotation in a horizontal plane, said rotatable member being connected at spaced points therein to said arms for moving the latter mutually and simultaneously toward and away from each other when the rotatable member is rotated.

23. A stanchion having yoke members comprising arms arranged for opening and closing movement and means comprising a rotatable member pivoted in said stanchion, means associated with said rotatable member at spaced points therein and co-operating with said arms, said means being formed for self-locking co-operation with said arms when the rotatable member is moved to closed position.

24. A stanchion comprising a support, a yoke mounted in the support and comprising arms arranged for closing and opening movement in said support and a rotatable member pivoted on the support, means forming an operating connection between spaced points on said rotatable member and the arms of the yoke whereby rotation of the member will draw the parts together and lock them in closed position.

In witness whereof, I have hereunto subscribed my name.

HENRY B. BABSON.